United States Patent [19]
Gil

[11] Patent Number: 5,500,941
[45] Date of Patent: Mar. 19, 1996

[54] OPTIMUM FUNCTIONAL TEST METHOD TO DETERMINE THE QUALITY OF A SOFTWARE SYSTEM EMBEDDED IN A LARGE ELECTRONIC SYSTEM

[75] Inventor: Luis Gil, Madrid, Spain

[73] Assignee: Ericsson, S.A., Madrid, Spain

[21] Appl. No.: 271,422

[22] Filed: Jul. 6, 1994

[51] Int. Cl.⁶ ...................................................... G06F 11/00
[52] U.S. Cl. ........................................................ 395/183.14
[58] Field of Search ................................ 395/575, 183.14, 395/183.01, 183.13, 185.1; 371/19, 23

[56] References Cited

U.S. PATENT DOCUMENTS

| | | | |
|---|---|---|---|
| 4,870,575 | 9/1989 | Rutenberg | 364/300 |
| 4,991,176 | 2/1991 | Dahbura et al. | 371/27 |
| 5,045,994 | 9/1991 | Belfer et al. | 364/200 |
| 5,272,704 | 12/1993 | Tong et al. | 371/23 |
| 5,293,323 | 3/1994 | Doskocil et al. | 364/551.01 |

OTHER PUBLICATIONS

Constantinescu, "A Decomposition Method for Reliability Analysis of Real–Time Computing Systems", 1994 Proc., Reliability & Maintainability, pp. 272–277.
Collas et al. "Reliability & Availability Estimation for Complex Systems: A Simple Concept and Tool", 1994 Pro. Reliability & Maintainability, pp. 110–113.
Abrams et al. "Chitra:Visual Analysis of Parallel & Distributed Programs in the Time, Event & Frequency Domains", 1992 IEEE, pp. 672–685.
Whiite et al., "Markov Chains for Testing Redundant Software", 1988 Proceedings, Reliability & Maintainability Sym. IEEE, 1988 pp. 426–433.
Richard H. Cobb and Harlan D. Mills, *Engineering Software Under Statistical Quality Control*, Nov. 1990, pp. 44–54.
John D. Musa, *Operational Profiles in Software–Reliability Engineering*, Mar. 1993, pp. 14–32.
Ricky W. Butler and George B. Finelli, *The Infeasibility of Quantifying the Reliability of Life–Critical Real–Time Software*, Jan. 1993, pp. 3–12.
P. Allen Currit, Michael Dyer, and Harlan D. Mills, *Certifying the Reliability of Software*, Jan. 1986, pp. 3–11.
Per Runeson and Claes Wohlin, *Usage Modelling: The Basis for Statistical Quality Control*, Jun. 1992.
James A. Whittaker, *A Case–Study in Software Usage Modeling*, Dec. 1992, pp. 1–28.
James A. Whittaker and J. H. Poore, *Markov Analysis of Software Specifications*, Jan. 1993, pp. 93–106.
John D. Musa, *The Operational Profile in Software Reliability Engineering: An Overview*, Apr. 1992, pp. 140–154.
Software Engineering Technology, Inc., *Software Certification: An Engineers Guide to Preparing and Performing Statistical Tests for Software*, Sep. 1993, pp. 1–10.

*Primary Examiner*—Robert W. Beausoliel, Jr.
*Assistant Examiner*—Joseph E. Palys

[57] ABSTRACT

A method of performing software validation testing on large electronic systems applies Usage Concepts specially modelled as Markov chains to forrealize the expected use of the system, to define the system behavior, and to introduce statistical measurements. The functional requirements of the software system are defined in a Markov chain by identifying a plurality of states through which the software system transitions when performing the functional requirements. Stimuli and responses which cause the software system to transition from one state to another are identified, and the probability of each state transition is calculated. Usage cases beginning at an invocation state and ending at a termination state of the software system are defined and listed in order of descending probability of occurrence in a Usage Profile. The Usage Profile, stimuli, and responses are automatically compiled into an automated test program, and associated test equipment is automatically programmed to generate a set of test cases. The set of test cases are then executed on the software system. The end of the set of test cases is determined, and the method analyzes and reports the software system quality.

15 Claims, 3 Drawing Sheets

\* = PARTIALLY AUTOMATED IN SUMIT
\*\* = FULLY AUTOMATED IN SUMIT

OPTIMUM FUNCTIONAL TEST METHOD TO DETERMINE THE QUALITY OF A SOFTWARE SYSTEM EMBEDDED IN A LARGE ELECTRONIC SYSTEM

BACKGROUND OF THE INVENTION

1. Field of the Invention

This invention relates to validation testing of large electronic systems with embedded software and, more particularly, to a method of automatically generating test equipment control programs which sequentially test the most likely failure cases for newly developed systems.

2. History of the Prior Art

The testing of large electronic systems with embedded software is a costly and time consuming operation. The main goal of such testing is essentially risk management. System quality is defined in terms of the impact of system faults or errors on the expected behavior of the system. Measured system behavior is contrasted with the expected system behavior as defined in the user's requirements specification. Traditionally, the cost of such testing is high because of the requirement for expensive test plants and the time needed to manually run the test cases.

The development effort for large electronic systems with embedded software is organized around various phases of the development process. Generally, the development process is partitioned into a number of serially occurring, basically mutually exclusive phases. The scope of activity that occurs at each phase varies depending upon whether the software system is entirely new or is a modification to an ongoing and evolving system.

During an initial phase, which might be characterized as a "conceptualization" phase, generic requirements are produced wherein the high-level functionality of the overall system is specified. It is during this phase that the ultimate users of the system elucidate their requirements and objectives to the system analysts. Various alternative solutions aimed at achieving the specified objectives may be proposed, and the analysts select the most viable solution and then generate the requirements.

A second phase, the "implementation" phase, commences when the requirements are further analyzed and parsed to obtain a refined system definition. The system is now viewed as comprising an arrangement of stand-alone, but interdependent modules. These modules are usually developed separately by different groups or individuals. The development effort at this juncture comprises coding of the modules in a specific computer language, such as the "C" language, and then testing the execution of the individual modules.

A third phase, called "integration", is initiated by combining appropriate modules into their respective subsystems, thereby forming the overall system. Subsystem testing may also be effected to ensure that the modules are properly linked and compatible.

A fourth phase, called "system test", begins when the overall system is handed off to the testers for validation testing. The testers have the task of trouble shooting the integrated system before its release to the end users. It is well established that the cost of correcting software defects after a software system has reached the end user is significantly greater than correcting defects found before the system reaches that stage. This has led to an increased emphasis on reduction of errors during system development, primarily by testing. The objective of the testers, therefore, is to locate as many potential failures as possible. A "failure" is a discrepancy between what was intended to be implemented and what the system actually does as revealed through testing. In a large system, system testers are faced with the problem of how to choose test cases effectively given practical limitations on the number of test cases that can be selected and tested.

The ability to determine the true quality of a system through traditional system testing is hindered by human language limitations and software characteristics. System requirements are written in human language, which is not mathematical, and therefore often has internal contradictions and a lack of completeness. The quality determination is also hindered by software characteristics which make it difficult to apply well known principles of quality control used broadly in industry for hardware quality testing. For example, since program code shows no degradation over time, it does not fit into the normal concept of mean-time-between-failures as used with hardware components.

Additionally, control of the process during conventional software development tends to be somewhat subjective in nature because, unlike the case of traditional hardware development, there are no sophisticated, objective control procedures that pervade or encompass all phases of the development. In effect, there are no universally applicable methods or techniques that can quickly and accurately perform detailed measurements and report on results within acceptable time limits and resource usage.

As noted above, during validation testing, the objective of the testers is to locate as many potential failures as possible. In very large systems, where operating history affects current system behavior, and where system functionality is very complex, the number of possible uses and system responses is very large and makes it impossible to run all possible cases. Thus it is not possible to prove that a large and complex system is entirely free of errors. Measurements representing the percentage of the functionality covered in a test set, i.e., Coverture Grade, have been defined according to different concepts related to software implementation, such as the number of internal states, or pathways therebetween, in the control flow used during the test.

Because it is not possible to run all possible test cases, economic factors normally determine the end of the testing cycle. Several attempts to introduce Stop criteria based on the statistical analysis of the test results have been proposed, but they have not been introduced on an industrial scale because of inherent inaccuracies.

The selection of test cases is another important consideration which impacts the efficiency of tests in finding system errors. Currently, test cases are selected either from implementation parameters, or from the tester's own personal experience. When selected from implementation parameters, the test case runs the program through all the states or branches in the program, and in this instance, it is possible the test generation and execution process.

The selection of test cases from implementation parameters suffers from a lack of consistency between the implementation parameters and the actual future use of the system. Such is the case, for example, when all the branches are tested at least once (i.e., 100% test coverture). Because of program loops and data corruption, it could be necessary to go through a combination of branches a number of times to get an unexpected result. Thus, just because all of the branches are tested at least once, this does not guarantee the detection of all the errors. Therefore estimations of system quality derived from such test cases are often inaccurate. On the other hand, the selection of test cases from the personal experience of the tester suffers from a lack of consistency from one test case to another, resulting in a quality estimation of unknown accuracy. Additionally, testing on the basis of personal experience does not provide a systematic method for automating test cases. In either event, the test must still be performed manually or with automated equipment which is manually programmed.

Some testers have turned to Usage Models in an attempt to select more meaningful test cases for validation testing. FIG. 1 is a high level functional block diagram illustrating the utilization of a Usage Model for validation testing in an existing system. A software CASE tool, such as the Software Usage Modeling and Integrated Testing (SUMIT) tool, is capable of automating or partially automating some of the steps in the validation process. The role of Usage Models in validation testing is described in "Software Certification: An Engineers Guide to Preparing and Performing Statistical Tests for Software," by Software Engineering Technology, Inc., Sep. 24, 1993.

Still referring to FIG. 1, the inputs to the validation process 1 for a given software system 10 are the specification document 11 for the software, the software's input domain 12, and some knowledge about expected interaction from the user community 13 with the software. The system specification 11 and the input domain 12 are used as the basis to construct a usage model structure 14 that describes the interaction from the user community 13. The usage model structure 14, along with pertinent data collected from the user community 13, is used to estimate usage model statistics 15. The usage model structure 14 and the usage model statistics 15 are then combined, and the combined usage model is subjected to rigorous analysis 16 to determine its ability to accurately characterize actual usage patterns.

Markov chain theory, described in more detail below, is used to derive a finite state machine and determine the probabilities of transitioning between the various states as an input to the usage model analysis 16. The analysis 16 is iteratively performed until an acceptable model is obtained. Such a model is called a verified usage model 18. From the verified usage model 18, sample usage sequences 19 are generated and then converted into test cases 21. The test cases 21 are executed on the software 22 during test execution 23 in order to achieve a certified software system 10.

When Usage Models are utilized for the selection of test cases, an enormous number of possible uses results. Since, for economic reasons all possible uses cannot be tested, random samples may be tested until reaching a preset statistical limit. In order to provide sufficient precision, however, the sample size must be larger than the test set size generated by current methods.

Other software testing methods have also been developed as shown in the following U.S. patents.

U.S. Pat. No. 5,293,323 to Doskocil et al. discloses a method of fault diagnosis during system operation using a process called Diagnostics by Confidence Measure Assessment (DCMA). A confidence measure is provided for each system test failure assessment, both by repeated testing of a single source and corroboration processing of many test results from different sources. Since this persistent measurement testing focuses on a known fault, it is not suited for use in broad validation testing of newly developed systems.

U.S. Pat. No. 4,991,176 to Dahbura et al. discloses a test method in which a system implementation is modelled as a finite state machine, and a minimum cost test sequence is generated to cover every state transition of the finite state machine. However, modelling of the system implementation does not enable the identification and testing of those failure cases which are most likely to occur during system use. Therefore, those failures which most greatly affect the system reliability and failure rate may not be tested, and an inconsistent and possibly inaccurate test result is achieved.

U.S. Pat. No. 4,870,575 to Rutenberg discloses a test method which performs a fault tree analysis with respect to the contents of a dynamic "stack of contradiction parameters" and then superimposes modified hardware and software fault trees onto each other. Thus, Rutenberg is designed to specifically test hardware-software interactions. Moreover, Rutenberg, like Dahbura above, utilizes a test method in which a system implementation is modelled rather than the system usage. Therefore, Rutenberg suffers from the same shortcoming as Dahbura, i.e., those failures which most greatly affect the system reliability and failure rate may not be tested, and a less than optimum test result is achieved.

U.S. Pat. No. 5,272,704 to Tong et al. discloses a method of generating nodes and branches of a diagnostic tree using a candidate generator, constraint propagator and best measurement generator, along with a model of a system to be diagnosed. Once again, Tong utilizes a test method in which a system implementation is modelled rather than the system usage. Therefore, Tong also focuses on diagnosing a known fault and suffers from the shortcoming of potentially failing to test those failures which most greatly affect the system reliability and failure rate. Thus, Tong also provides a less than optimum test result.

It would be a distinct advantage to have a validation test method which formalizes the expected use of the system, defines the system behavior, and introduces statistical measurements to identify the most likely system failures during actual system use, and automatically generates control programs which direct associated test equipment to sequentially test the predicted system failures in the order in which they are most likely to occur.

SUMMARY OF THE INVENTION

The present invention is a method of performing validation testing to determine the quality of a software system embedded in a large electronic system having associated test equipment. The method begins by defining the functional requirements of the software system. Next, a Markov chain is constructed by identifying a plurality of states through which the software system transitions when performing the functional requirements; defining a plurality of stimuli which cause the software system to transition from one of the plurality of states to another; identifying a response, comprising at least one state transition, which occurs in response to each of the plurality of stimuli for each of the plurality of states; and calculating the probability of occurrence of each of the state transitions.

Next, a plurality of usage cases are identified, with each usage case comprising a set of state transitions beginning at an invocation state and ending at a termination state of the software system. A Usage Model for the software system, comprising a plurality of usage cases, is then built, and the probability of occurrence of each of the usage cases is calculated. From the usage cases of the Usage Model, a Usage Profile for the software system is built by listing the usage cases in order of descending probability of occurrence. This is followed by automatically compiling the Usage Profile, stimuli, and responses into an automated test program and programming the associated test equipment with the automated test program to generate a set of test cases. The set of test cases are then executed on the software system. The end of the set of test cases is determined, and the method analyzes and reports the software system quality.

BRIEF DESCRIPTION OF THE DRAWING

The invention will be better understood and its numerous objects and advantages will become more apparent to those skilled in the art by reference to the following drawing, in conjunction with the accompanying specification, in which.

DETAILED DESCRIPTION

The present invention overcomes the problems with human language limitations and software characteristics by (1) applying Usage Concepts specially modelled as Markov chains to forrealize the expected use of the system, to define the system behavior, and to introduce statistical measurements, and by (2) automating test case generation and test execution in order to limit as much as possible, the time required for the test.

In Markov chains, system functionality is modelled as states and transitions. In Usage Profiles, the probability of each transition is stated. By combining Markov chains and Usage Profiles, the present invention verifies software systems by analyzing the possible use cases, and by selecting as a test set, the use cases with higher probabilities of occurrence. Additionally, the computation facilities of Markov chains generate test sets in such a way that control programs for test equipment are generated automatically. In this manner, the efficiency of usage testing is gained by detecting the failures that are most likely to effect the final user, and testing time is reduced because of automatic test generation and execution. Likewise, the final estimation of system quality is greatly improved because the method of the present invention detects errors in the use cases most likely to occur. Errors in the use cases with very low probabilities of occurrence may be overlooked with this approach, but such oversight has minimal impact since the frequency of occurrence of such cases is very long, perhaps longer than the expected life of the system.

Figure 1:
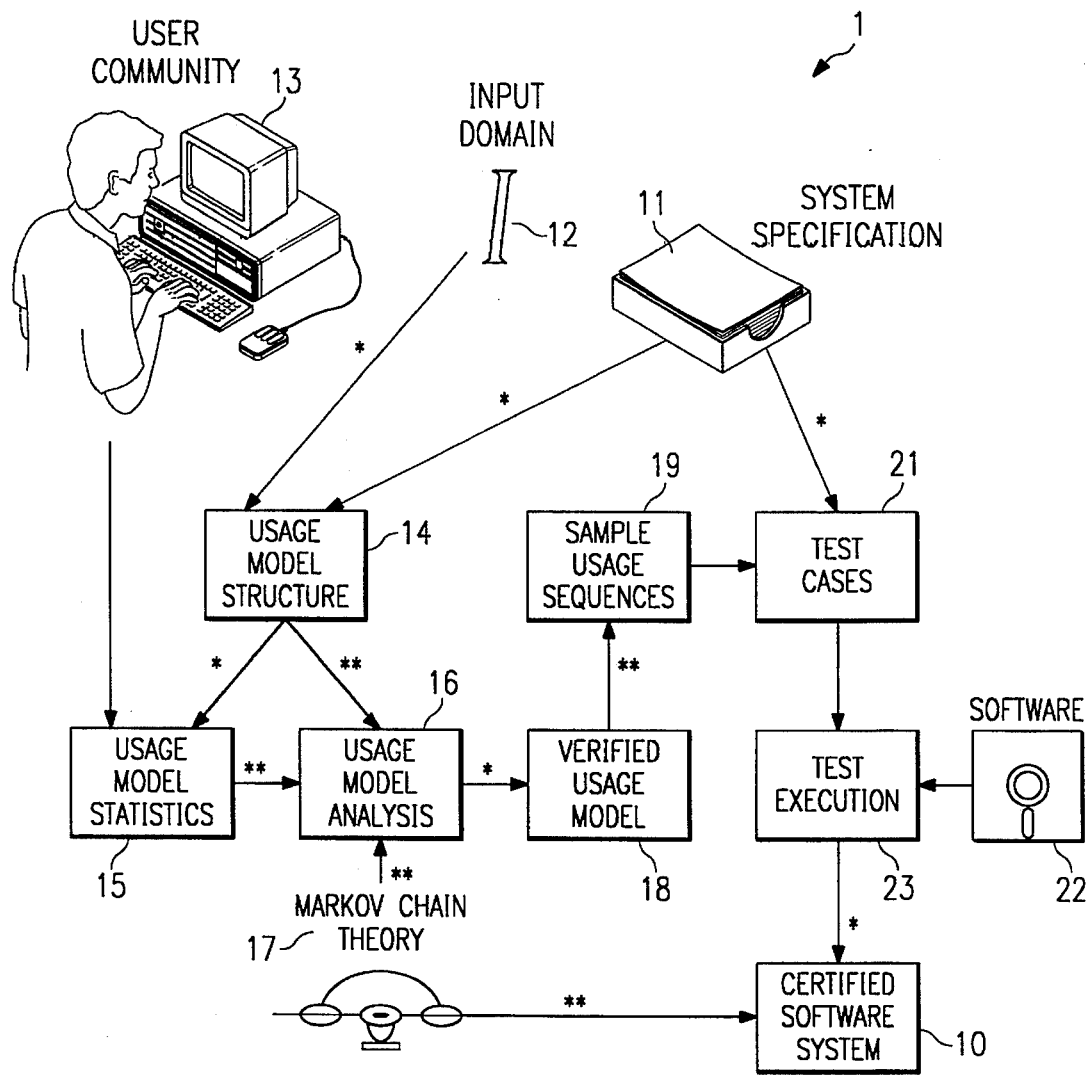
FIG. 1 (Prior art) is a high level functional block diagram illustrating the utilization of a Usage Model for validation testing in an existing system.
Figure 2:
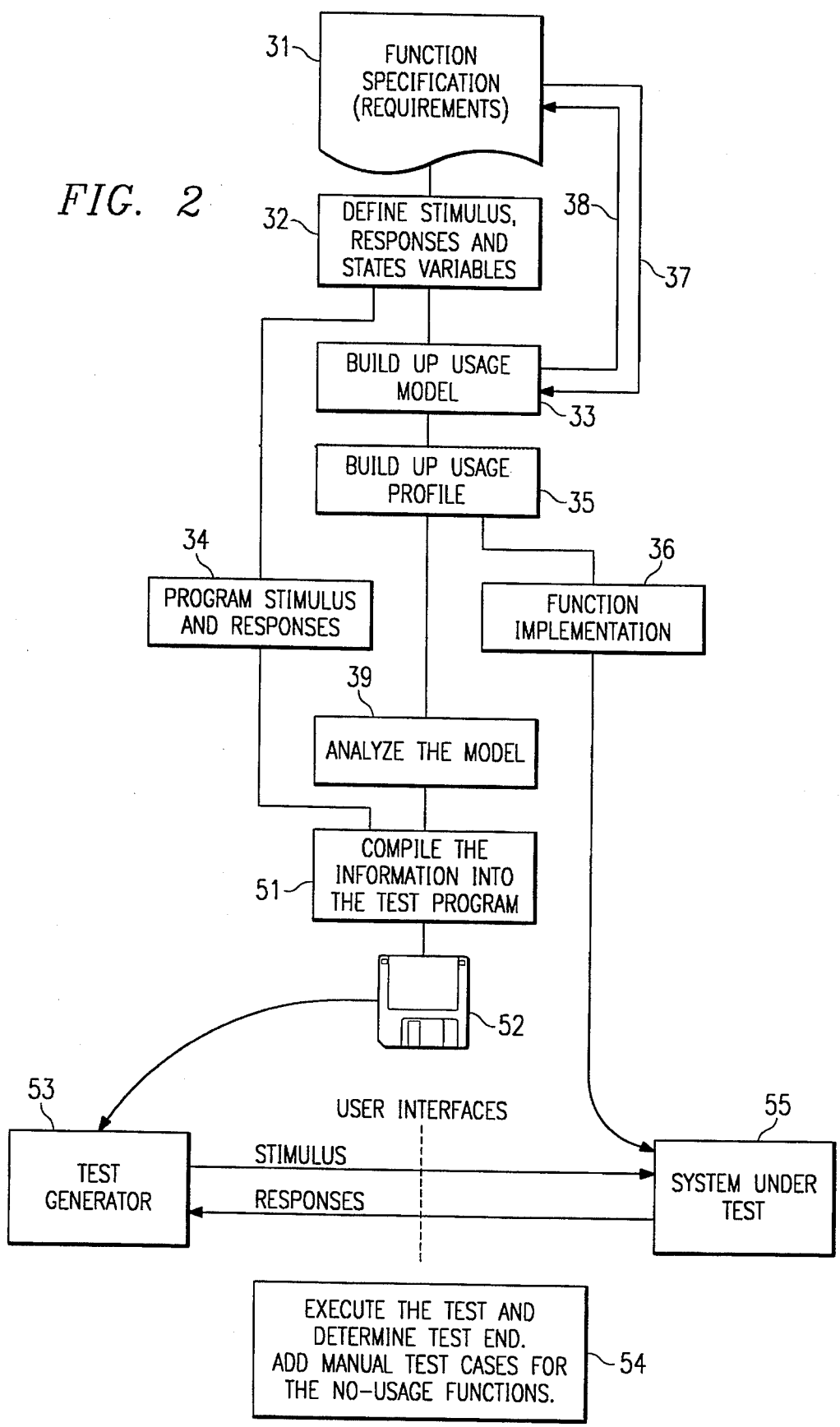
FIG. 2 is a high level flow diagram illustrating a method of software validation testing performed in accordance with the teachings of the present invention.

FIG. 2 is a high level flow diagram illustrating a method of software validation testing performed in accordance with the teachings of the present invention. The method of the present invention begins at 31 with the identification of the functional requirements of the software system through a thorough analysis of its requirements specification. The functional requirements of the software system may be considered as a number of stimuli to the software system and corresponding responses from the software system. At step 32, the user's analysis of the requirements specification leads to the definition of stimuli, responses, and state variables for various use cases. In defining the stimuli and responses, the user defines physical characteristics of the real-world software system in sufficient detail to properly match the characteristics of applicable test equipment, without so much detail that the Usage Model becomes too complex.

The stimuli, responses, and state variables are utilized at step 33 for building a Usage Model, and are also passed to step 34 where they are input into a test program. At step 35, a Usage Profile is built according to Usage Models based in Markov chains.

The analysis of the specification and system requirements yields an irreducible Markov chain. There are two phases in the construction of the Markov chain, a structural phase and a statistical phase. In the structural phase, a state diagram illustrating the states and paths of the chain are established, and in the statistical phase, probabilities are assigned for each transition between states.

Figure 3:
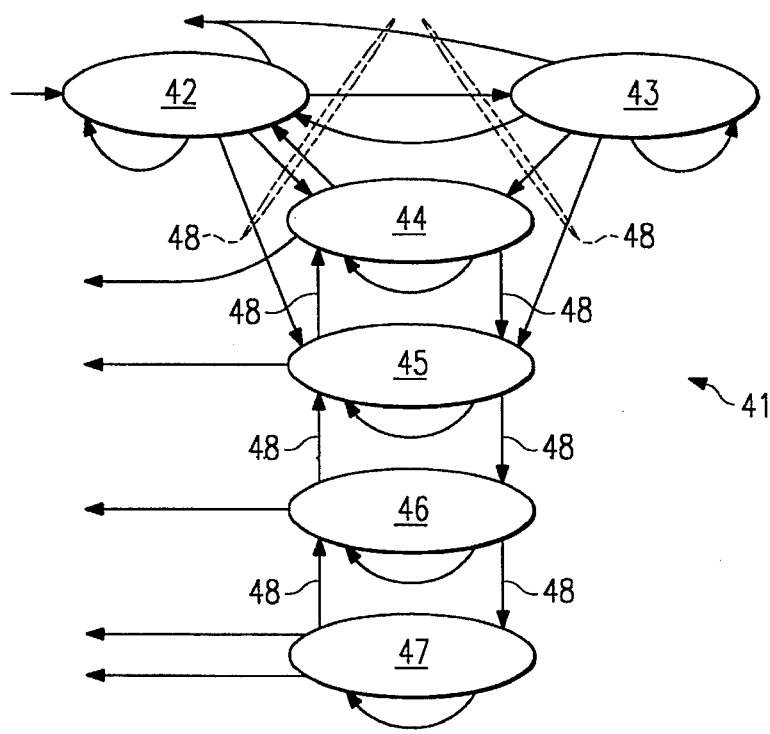
FIG. 3 is a typical existing state diagram illustrating various states and transition paths therebetween.

FIG. 3 is a typical existing state diagram 41 illustrating various states 42–47 and transition paths 48 therebetween. During the construction of a Markov chain, a state diagram similar to state diagram 41 is first constructed, and then the probabilities of each transition 48 are calculated or estimated.

The Markov chain is the source of test sequences for the software. A statistical test case (i.e., usage case) is any connected state sequence of the usage chain that begins with an invocation state and ends with a termination state. Each usage state is further associated with a stimulus from the input domain of the software.

Referring again to FIG. 2, after construction of the Markov chain, a Usage Profile is derived at step 35. The Usage Profile is the set of all the transition probabilities in the Markov chain. Derivation of the Usage Profile begins during the second phase of the construction of the Markov chain, i.e., by calculating all the transition probabilities where there is sufficient data to do so. The probabilities of the remaining transitions are then estimated. Next, known algorithms are used to calculate the probability of transitioning through each state, and, through repeated iterations, the user refines the estimated probabilities matching the state and transition probabilities with all possible data in high and low levels of abstraction.

The process of generating usage cases is easily automated using a random number generator and any high level language. The tester simply steps through the states of the chain based upon the transition probabilities. The sequence of states visited, or path, becomes the usage case. For example, a chain may have a unique start state $S_0$ (which represents invocation of the software), a unique final state $S_f$ (which represents termination of the software), and a set of intermediate usage states $\{S_i\}$. In this case, the state set:

$$S = \{S_0, \{S_i\}, S_f\}$$

is ordered by the probabilistic transition relation:

$$(S \times [0, 1] \times S).$$

For each usage case defined by this relation, the next state is independent of all past states, given the present state. Any number of usage cases can be obtained automatically from the model.

The processes of deriving a Usage Model and a Usage Profile involve an iterative process of comparing the generated usage cases 35 with the functional requirements 31 of the real-world software system. In a translation step 37, characteristics of the real-world software system are translated into parameters of the Usage Model. The parameters of the Usage Model are then subjected to a statistical analysis step 38 in which determinations are made as to the extent to which the Usage Model exhibits characteristics of the real-world software system. By iteratively repeating the translation step 37 and the analysis step 38, the process results in a Usage Model and Usage Profile in which the percentage of the Usage Model parameters exhibiting characteristics of the real-world software system exceeds a predetermined level chosen to ensure that the Usage Model adequately describes the interaction of the real-world software system with its end users.

Next, at step 39, the model data is loaded into an analyzer in the form of a "probability transition" matrix, a "state-stimulus" matrix, and a "state-expected response" matrix. This enables an analysis which explores all possible usage cases for transitioning between two states in the model. The probability transition matrix is a 2-D matrix with the state labels as indices and the usage case probabilities as entries in the matrix. The probability transition matrix is square, and each of its rows sums to one.

In order to cope with possible computer capacity limitations, two thresholds are established to limit the number of usage cases selected for testing. A first threshold is established which places a lower bound on the total probability of a given usage case. The explorations of usage cases with a total probability lower than this threshold are terminated. Second, the exploration of a usage case is stopped when a particular single transition in the usage case has a probability lower than a second threshold value. In both cases, an exploration ends if a predetermined number of transitions is exceeded.

The second threshold limit is reduced for each run of the analyzer in order to set an upper limit on the number of usage cases in the Usage Profile, and until the probabilities of all the usage cases with the same number of transitions is less than, for example, one-fifth the life of the system. At this point:

a path's probability ≈5×average duration in minutes of one use of the function/(expected system life in years× number of users×function traffic in erlangs×525, 600).

A file is generated which contains the result of each run of the analyzer. Analyses are then iteratively performed with higher and higher probability threshold values until the final run results in zero usage cases. All of the files thus generated are appended, and repeated usage cases are deleted to generate a file with a final list of usage cases. This file is sorted and renumbered decreasing order and printed in two ways: by individual path probability and by the accumulated probability.

Still referring to FIG. 2, at step 51, a compiler then combines the final list generated at step 39 with all the programs related to stimulus generation and response detection from step 34. At step 52, the combined information is stored in a single file with the proper format to control associated test generation equipment 53. The test program is then compiled to either run all the test cases and record cases of nonconformance, or to stop testing cases when the program detects a nonconforming case.

The test is then run at 54, and errors in the system under test 55 are detected, accounted, and removed. The end of the test may then be determined in two different ways. First, the number of test cases run may be fixed due to economic constraints. It is then possible to statistically determine a limit to the reliability (i.e., the failure probability) of the tested system. Conversely, the end of the test may also be determined by directly specifying a failure probability.

The statistical determination of the failure probability is performed in the following manner: Assuming errors follow a binomial distribution in the usage cases, the probability of a failure (to select a case with an error) is the same for all the use attempts. The selection of a test set of N cases is approximately equivalent to the selection of a random sample of size S, being:

$S = Q$ /individual probability of the N case.

The number of failures (F) in such a sample (S) is:

$F = S \times \Sigma$(individual probabilities of the cases found with error).

Therefore, the failure probability (p) is:

$p = F / S = \Sigma$(individual probabilities of the cases found with error). Taking into account the characteristics of the binomial distribution, the error (E) inherent this probability calculation is:

$$E = Z \sqrt{(p(1-p)/S)}$$

where $Z = 1.96$ for 95% confidence, and $Z = 2.58$ for 99% confidence. Thus, the limit of the probability of failure of the system for each use attempt, after removal of the errors detected in the system, is:

$$P < (p+E)(M-Q)/M.$$

In the case that there are no errors found during the test, in order to calculate a limit for p, it is supposed that the last case (case N) has one error.

When the failure probability (P) is specified, the test continues through the list until the same condition is fulfilled. Thus:

$$P < (p+E)(M-Q)/M.$$

Figure 4:
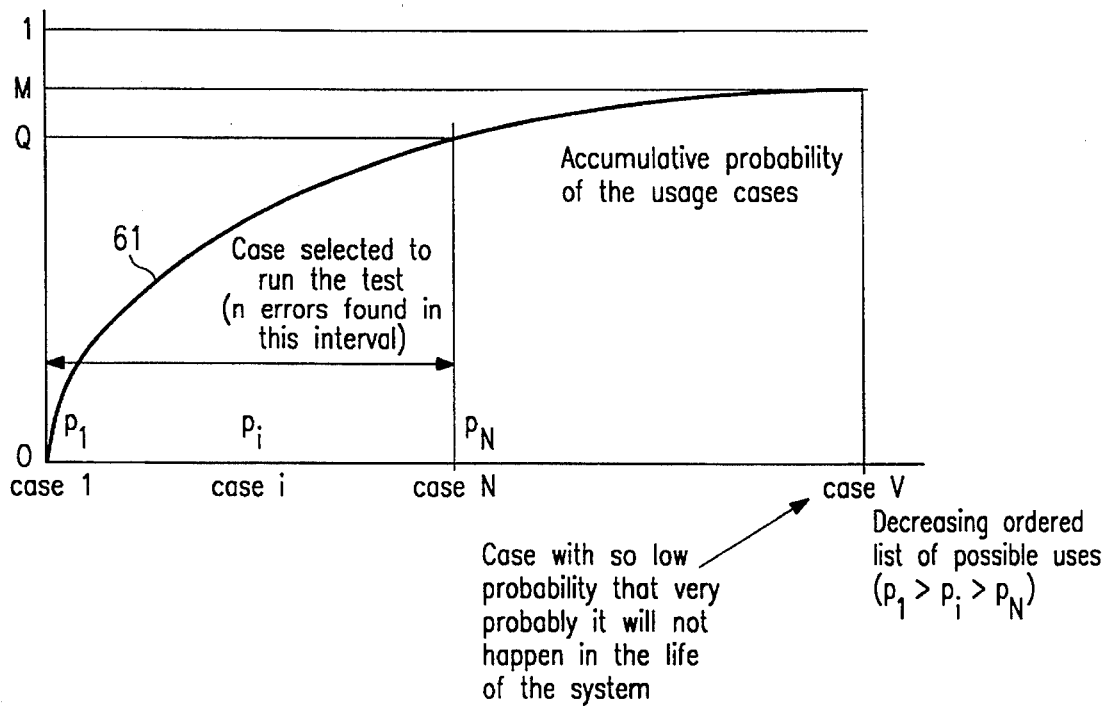
FIG. 4 is a graph of Usage Coverture versus usage cases in decreasing order of probability of occurrence.

FIG. 4 is a graph of Usage Coverture versus usage cases in decreasing order of probability of occurrence. Usage Coverture is the percentage of all test cases, defined according to a specific criterion, selected to test a particular function. Cases with higher probabilities of occurrence will be used more frequently, and appear first on the final list of test cases.

In FIG. 4, a curved line 61 represents the cumulative probability (i.e., sum of the individual probabilities) of the usage cases. The sum of the probabilities of all of the possible usage cases equals one (1.0), represented by a Usage Coverture equal to one (1.0). If the number of usage cases chosen to run the test is large enough, the last case will have a probability of occurrence so low that it will probably not happen during the life of the system (Case V). At this point, the cumulative probability of the usage cases is represented by a Usage Coverture of "M". The Usage Coverture of a test selecting N cases from the final list is the sum of the probabilities of the N different cases. This is represented by a Usage Coverture of "Q". By selecting the first N cases in the final list, the Usage Coverture is maximized along with the test efficiency from the point of view of the use of the particular function being tested.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. An electronic media for a stored program for electronic systems wherein said stored program performs the method of performing validation testing to determine the quality of a software system embedded in a large electronic system having associated test equipment, said method comprising the steps of:

defining a set of functional requirements for said software system;

constructing a Markov chain, said constructing step further comprising the steps of, identifying a plurality of states through which said software system transitions when performing said functional requirements;

defining a plurality of stimuli which cause said software system to transition from one of said plurality of states to another;

identifying a response, comprising at least one state transition, which occurs in response to each of said plurality of stimuli for each of said plurality of states; and calculating the probability of occurrence of each of said state transitions;

identifying a plurality of usage cases, each of said usage cases comprising a set of state transitions beginning at an invocation state and ending at a termination state of said software system;

building a Usage Model for said software system, said Usage Model comprising a plurality of usage cases;

calculating the probability of occurrence of each of said usage cases;

building a Usage Profile for said software system by listing said usage cases in order of descending probability of occurrence;

automatically compiling said Usage Profile, said stimuli, and said responses into an automated test program;

providing a stored program media containing the programming for said associated test equipment with said automated test program to generate a set of test cases;

executing said set of test cases on said software system;

determining the end of said set of test cases; and analyzing and reporting said software system quality.

2. An electronic media of claim 1 wherein said program's said step of building a Usage Model further includes the steps of:

translating characteristics of said software system into parameters of said Usage Model; and statistically analyzing said Usage Model parameters to determine the extent to which said parameters exhibit characteristics of said software system.

3. An electronic media of claim 2 wherein said program's step of building a Usage Model includes iteratively repeating the steps of translating characteristics of said software system into parameters of said Usage Model and statistically analyzing said Usage Model parameters, until a percentage of said Usage Model parameters exhibiting characteristics of said software system exceeds a predetermined level.

4. An electronic media of claim 3 wherein said program's said step of building a Usage Model for said software system includes automatically generating said usage cases using a random number generator and a high level software language.

5. An electronic media of claim 1 wherein said program's said step of building a Usage Profile for said software system includes loading said Usage Model into an analyzer to explore all possible usage cases transitioning between two states in said Usage Model.

6. An electronic media of claim 5 wherein said program's said step of building a Usage Profile for said software system includes loading said Usage Model into an analyzer in the form of a probability transition matrix, a state-stimulus matrix, and a state-expected response matrix.

7. An electronic media of claim 6 wherein said program's said step of building a Usage Profile for said software system includes the steps of:

eliminating usage cases from said Usage Profile if the total probability of a given usage case is less than a first predetermined threshold value;

eliminating usage cases from said Usage Profile if the probability of a particular single transition in a given usage case is less than a second predetermined threshold value; and eliminating usage cases from said Usage Profile if the number of state transitions in a given usage case exceeds a predetermined number.

8. An electronic media of claim 7 wherein said program's said step of building a Usage Profile for said software system includes setting an upper limit on the number of usage cases in the Usage Profile, said step further comprising the steps of:

causing at least two runs of said analyzer;

reducing the second threshold value by a predetermined amount for each run of said analyzer;

generating a file which contains the result of each run of said analyzer; and stopping said analyzer runs when the probabilities of all the usage cases with the same number of transitions is less than one-fifth the life of the software system.

9. An electronic media of claim 8 wherein said program's said step of building a Usage Profile for said software system includes the steps of:

increasing said first and second threshold values by a predetermined amount for each run of said analyzer;

generating a file which contains the result of each run of said analyzer;

stopping said analyzer runs when a run results in zero usage cases; and creating a final list of usage cases by appending all of the files generated by the runs of the analyzer and deleting repeated usage cases.

10. An electronic media of claim 9 wherein said program's said step of building a Usage Profile for said software system includes the steps of:

sorting the usage cases in said final list of usage cases by probability of occurrence; and numbering the usage cases in order of decreasing probability of occurrence.

11. An electronic media of claim 10 wherein said program's said step of automatically compiling said Usage Profile, said stimuli, and said responses into an automated test program includes compiling said Usage Profile, said stimuli, and said responses into a single file formatted to control said associated test equipment for said large electronic system.

12. An electronic media of claim 11 wherein said program's said step of executing said set of test cases includes executing said set in order of decreasing probability of occurrence.

13. An electronic media of claim 12 wherein said program's said step of determining the end of said set of test cases includes the steps of:

calculating a failure probability for the software system following execution of each test case; and stopping the execution of said test set when the failure probability of said software system reaches a predetermined level.

14. An electronic media of claim 12 wherein said program's said step of determining the end of said set of test cases includes stopping the execution of said test set following the execution of a predetermined number of test cases.

15. An electronic media of claim 14 wherein said program's said step of analyzing and reporting said software system quality includes statistically determining a failure probability for the software system.

* * * * *

UNITED STATES PATENT AND TRADEMARK OFFICE
CERTIFICATE OF CORRECTION

PATENT NO. : 5,500,941
DATED : March 19, 1996
INVENTOR(S) : Gil, Luis

It is certified that error appears in the above-indentified patent and that said Letters Patent is hereby corrected as shown below:

| | |
|---|---|
| [57] Abstract, line 3 | Replace "forrealize" With --formalize-- |
| Column 5, line 30 | Replace "forrealize" With --formalize-- |
| Column 7, line 39 | Replace "525, 600" With --525,600-- |
| Columns 8, line 12 | Begin new line with "Taking into account" |
| Columns 8, line 20 | Begin new line with at "Thus, the limit" |

Signed and Sealed this

Ninth Day of July, 1996

Attest:

BRUCE LEHMAN

Attesting Officer     Commissioner of Patents and Trademarks